United States Patent
Adachi

[11] 3,850,277
[45] Nov. 26, 1974

[54] CLUTCH ASSEMBLY
[75] Inventor: Kazuma Adachi, Yao, Japan
[73] Assignee: Kabushiki Kaisha Daiken Seisakusho, Osaka Pref., Japan
[22] Filed: Dec. 29, 1972
[21] Appl. No.: 319,719

[30] Foreign Application Priority Data
Jan. 19, 1972  Japan.............................. 47-478926

[52] U.S. Cl.............................. 192/107, 192/113 A
[51] Int. Cl............................................ F16d 55/02
[58] Field of Search........ 192/107 M, 107 R, 70.14, 192/113 A

[56] References Cited
UNITED STATES PATENTS

| | | | |
|---|---|---|---|
| 2,163,884 | 6/1939 | La Brie | 192/107 M |
| 2,885,047 | 5/1959 | Kehrl | 192/113 A |
| 3,161,260 | 12/1964 | Benini | 192/113 A |
| 3,191,734 | 6/1965 | Batchelor et al. | 192/70.14 |
| 3,221,853 | 12/1965 | Batchelor et al. | 192/107 M |
| 3,298,476 | 1/1967 | Day | 192/113 A |
| 3,318,424 | 5/1967 | Morrison | 192/113 A |
| 3,329,246 | 7/1967 | Kaplan | 192/113 A |

Primary Examiner—Samuel Scott
Assistant Examiner—Wesley S. Ratliff, Jr.
Attorney, Agent, or Firm—Holman & Stern

[57] ABSTRACT

A clutch in which there is provided a clutch disc having clutch facings made of cerametallic or like material, a flywheel having a friction surface to be brought into frictional contact with one of the facings, and a pressure plate supported by a clutch cover for conjoint rotation with the flywheel and urged in a direction to press the facing against the flywheel, with the pressure plate having a friction surface to be brought into frictional contact with the other facing. Segments made of heat-treated hard steel plate are fixed to each of the flywheel and the pressure plate to provide the friction surface thereof.

3 Claims, 3 Drawing Figures

PATENTED NOV 26 1974　　3,850,277

CLUTCH ASSEMBLY

BACKGROUND OF THE INVENTION

The present invention relates to an improvement in clutches including a clutch disc provided with clutch facings made of cerametallic or like material.

PRIOR TECHNIQUES

Clutches which are engaged and disengaged frequently include clutch facings made of cerametallic or like material to prevent rapid wear of the facings. Since the flywheel and pressure plate for clamping the clutch facings in frictional contact therewith when the clutch is in the engaged state are made of cast iron, the friction surfaces of the flywheel and the pressure plate have relatively low hardness. For this reason, during the sliding frictional contact between the friction surfaces and the clutch facings upon clutch engaging and disengaging operations, especially during the contact therebetween at the early stage of engagement of the clutch, there occurs impact friction due to the difference in the rotational speed of the parts, causing marked wear, abrasion or scratches on the friction surfaces of the flywheel and pressure plate which are low in hardness which results in serious deterioration of the frictional properties thereof.

SUMMARY OF THE INVENTION

An object of this invention is to provide a clutch which includes a clutch disc provided with clutch facings made of cerametallic or like material and which is capable of retaining stable frictional properties over a prolonged period of time for the engagement of the clutch.

Another object of this invention is to greatly improve the durability of the friction surfaces of the flywheel and pressure plate.

Still another object of this invention is to improve the durability of the friction surfaces as stated above with very simple means.

To fulfill the foregoing objects, the present invention is characterized in that segments made of heat-treated hard steel plate are fixed to the flywheel and pressure plate to provide the friction surfaces thereof. The segments are in the form of a plurality of divided pieces and are fixed to each of the flywheel and the pressure plate substantially in a planar arrangement to form each of the friction surfaces.

Through heat treatment, the segments are provided with a hardness capable of resisting the hardness of the clutch facings so that they are free of defacement or damage even when brought into contact with the clutch facings with impact. Thus, the friction surfaces of the flywheel and pressure plate have remarkably improved abrasion resistance and frictional properties which remain stable over a prolonged period of time.

The segments are in the form of a plurality of divided pieces to provide one friction surface. This construction serves to minimize the distortion of the hard steel plate due to the heat treatment, eliminates difficulties in fixing them to the flywheel or pressure plate, and assures accuracy of the plane of the friction surface when they are fixed in position, while permitting easy correction of the friction surface.

DESCRIPTION OF THE PREFERRED EMBODIMENT

Figure 1:
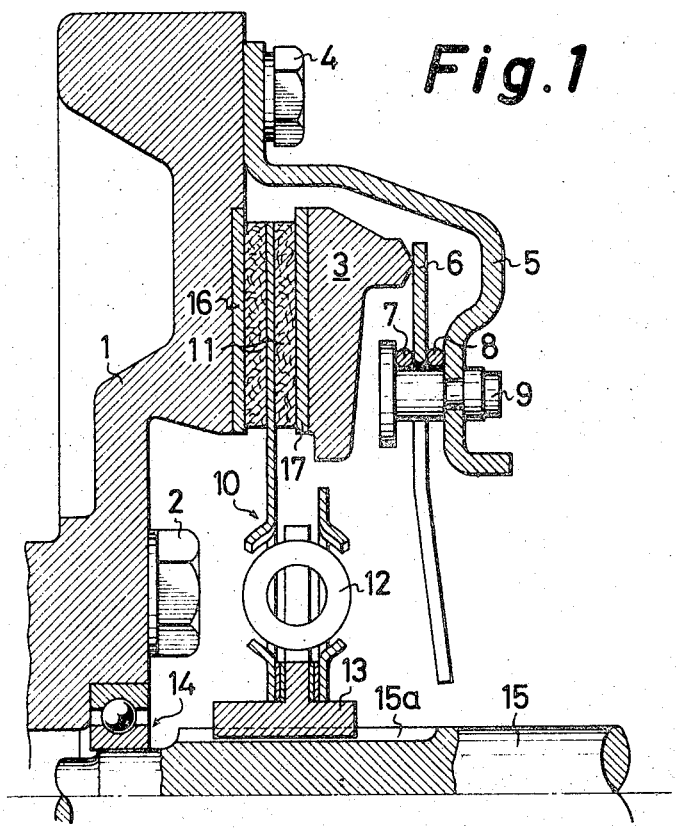
FIG. 1 is a view in vertical section showing the construction of principal part of an embodiment according to the present invention, with the lower half portion thereof under the centerline being omitted.

Referring to the drawings, a flywheel 1 is mounted on an unillustrated drive shaft or means of bolts 2 for conjoint rotation. As already well known, a pressure plate 3 is supported through unillustrated strap plates by a clutch cover 5 fixed to the flywheel 1 by bolts 4 so as to be rotatable in the direction of rotation of the flywheel 1 and movable axially. In the case of a clutch including a diaphragm spring 6 as illustrated, the pressure plate 3 is urged toward the flywheel 1 under the elastic restoring force of the spring 6. The diaphragm spring 6 and wire rings 7 and 8 fulcruming the spring 6 are supported on the clutch cover 5 by means of connecting members 9.

A clutch disc 10 has, on its peripheral opposite side faces, clutch facings 11 made of cerametallic or like material and is disposed between the flywheel 1 and the pressure plate 3. When the clutch is engaged, the diaphragm spring 6 acting on the pressure plate 3 causes the clutch disc 10 to be clamped between the friction surfaces of the flywheel 1 and pressure plate 3 for the transmission of torque of the flywheel 1.

The clutch disc 10 further has a spline hub 13 connected thereto by means of a member such as a torsion spring 12 for absorbing vibration in the rotational direction. The spline hub 13 is splined to a splined portion 15a of a main drive shaft 15 which is rotatably supported at its one end on the flywheel 1 by means of a pilot bearing 14. When engaged, the clutch delivers the torque to the main drive shaft 15.

In the foregoing construction, segments 16 and 17 made of heat-treated hard steel plate are fixed to the flywheel 1 and pressure plate 3 respectively to provide the friction surfaces thereof which face the clutch facings 11.

Figure 2:
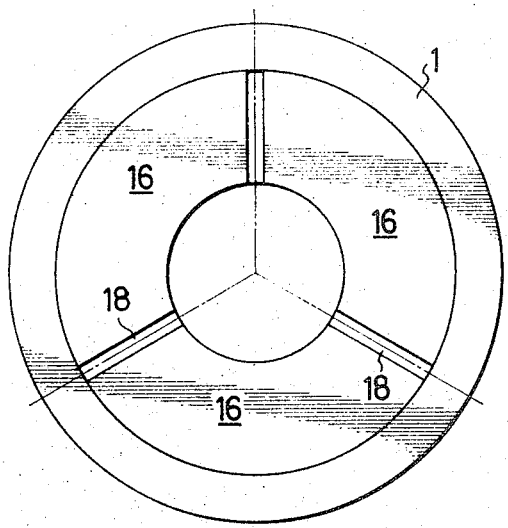
FIG. 2 is a side elevation showing the friction surface of a flywheel.
Figure 3:
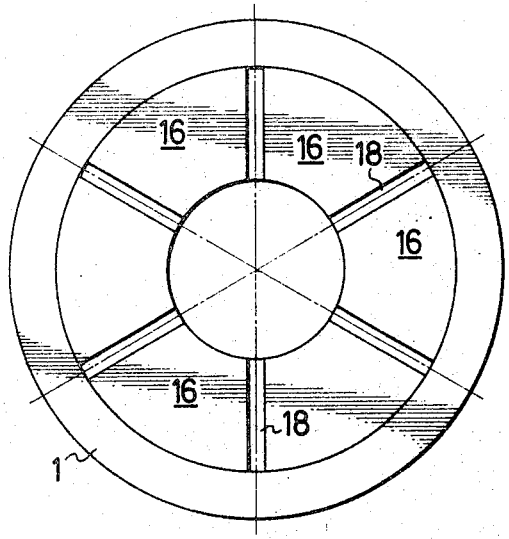
FIG. 3 is a view showing another embodiment of the portion shown in FIG. 2.

As shown as the friction surface of the flywheel 1 in FIGS. 2 and 3, each set of segments 16 and 17 is in the form of a suitable number of divided pieces arranged in the circumferential direction. As illustrated, a radially extending clearance 18 may be provided between the adjacent segments 16 or 17. During the rotation of the clutch, the clearances 18 permit the air to flow therethrough in the centrifugal direction to cool off the friction surface.

The construction comprising a suitable number of the divided segments 16 or 17 arranged in the circumferential direction serves to minimize dimensional variations resulting from heat treatment and provide an accuratly planar friction surface.

Preferably, the hardness of the segments 16 and 17 given by the heat treatment is such that the segments may be free of scratches and abrasion when brought into frictional contact with the clutch facings 11 made of a cerametallic material, so as to assure improved abrasion resistance. The segments 16 and 17 may be fixed to the flywheel 1 and pressure plate 3 respectively by suitable means as by riveting, screwing, brazing, etc.

Although the foregoing embodiment has been illustrated with respect to a diaphragm clutch which is adapted to be engaged and disengaged by means of the diaphragm spring 6, the present invention is of course applicable to the clutches of the type wherein clutch release levers are used in place of the diaphragm spring.

What is claimed is:

1. A clutch assembly comprising a clutch disc having clutch facings made of cerametallic or like material, a flywheel having a friction surface to be brought into frictional contact with one of the facings, the friction surface including separate segments made of heat-treated hard steel plate and fixed to the flywheel, and a pressure plate urged in a direction to press the facing against the friction surface of the flywheel, a clutch cover supporting said pressure plate for conjoint rotation with the flywheel, the pressure plate having a friction surface to be brought into frictional contact with the other facing, and the second-mentioned friction surface including separate segments made of heat-treated hard steel plate and fixed to the pressure plate thereby improving the durability of the friction surfaces of the flywheel and the pressure plate.

2. The clutch assembly as set forth in claim 1 wherein the segments fixed to each of the flywheel and pressure plate are in the form of a suitable number of divided pieces arranged in its circumferential direction.

3. The clutch assembly as set forth in claim 1 wherein the segments fixed to each of the flywheel and pressure plate are in the form of a suitable number of divided pieces arranged in its circumferential direction, with radially extending air flow grooves provided between the segments.

* * * * *